United States Patent [19]
Sakamoto et al.

[11] Patent Number: 5,151,640
[45] Date of Patent: Sep. 29, 1992

[54] SCANNING DEVICE HAVING A MEMORY FOR STORING DRIVING STEPS FOR A STEPPING MOTOR

[75] Inventors: Masahiro Sakamoto; Junnosuke Kataoka, both of Tokyo, Japan

[73] Assignee: Canon Kabushiki Kaisha, Tokyo, Japan

[21] Appl. No.: 607,049

[22] Filed: Oct. 31, 1990

[30] Foreign Application Priority Data

Oct. 31, 1989 [JP] Japan .................................. 1-281648
Oct. 31, 1989 [JP] Japan .................................. 1-281649
Oct. 31, 1989 [JP] Japan .................................. 1-281650

[51] Int. Cl.⁵ .............................................. H02P 8/00
[52] U.S. Cl. ...................................... 318/696; 358/406
[58] Field of Search ............... 318/696, 685; 358/494, 358/406

[56] References Cited

U.S. PATENT DOCUMENTS

| | | | |
|---|---|---|---|
| 4,642,544 | 2/1987 | Furumura | 318/696 |
| 4,724,330 | 2/1988 | Tahno | 358/494 X |
| 4,792,816 | 12/1988 | Kennedy, Jr. | 346/108 |
| 4,926,270 | 5/1990 | Sakamoto . | |

Primary Examiner—William M. Shoop, Jr.
Attorney, Agent, or Firm—Fitzpatrick, Cella, Harper & Scinto

[57] ABSTRACT

A scanning device comprises: a stepping motor; a memory device for storing drive data for driving the stepping motor for each scanning unit which does not correspond to each drive step of the stepping motor; and a motor driving device for driving the stepping motor in accordance with the drive data read from the memory device.

12 Claims, 5 Drawing Sheets

FIG. 4

| TABLE ADDRESS | CONTENTS OF ROM TABLE DATA (2byte) | |
|---|---|---|
| 0 | 0 1 0 0 0 1 1 1 | 0 1 0 0 0 1 1 1 |
| 1 | 0 1 0 1 0 0 1 1 | 0 0 1 1 1 0 0 0 |
| 2 | 0 1 0 1 1 1 0 0 | 0 0 1 0 0 1 1 0 |
| 3 | 0 1 1 0 0 0 1 0 | 0 0 0 1 0 1 0 0 |
| 4 | 0 1 1 0 0 1 0 0 | 1 0 0 0 0 0 0 0 |
| 5 | 0 1 1 0 0 0 1 0 | 1 0 0 1 0 1 0 0 |
| 6 | 0 1 0 1 1 1 0 0 | 1 0 1 0 0 1 1 0 |
| 7 | 0 1 0 1 0 0 1 1 | 1 0 1 1 1 0 0 0 |
| 8 | 0 1 0 0 0 1 1 1 | 1 1 0 0 0 1 1 1 |
| 9 | 0 0 1 1 1 0 0 0 | 1 1 0 1 0 0 1 1 |
| 10 | 0 0 1 0 0 1 1 0 | 1 1 0 1 1 1 0 0 |
| 11 | 0 0 0 1 0 1 0 0 | 1 1 1 0 0 0 1 0 |
| 12 | 1 0 0 0 0 0 0 0 | 1 1 1 0 0 1 0 0 |
| 13 | 1 0 0 1 0 1 0 0 | 1 1 1 0 0 0 1 0 |
| 14 | 1 0 1 0 0 1 1 0 | 1 1 0 1 1 1 0 0 |
| 15 | 1 0 1 1 1 0 0 0 | 1 1 0 1 0 0 1 1 |
| 16 | 1 1 0 0 0 1 1 1 | 1 1 0 0 0 1 1 1 |
| 17 | 1 1 0 1 0 0 1 1 | 1 0 1 1 1 0 0 0 |
| 18 | 1 1 0 1 1 1 0 0 | 1 0 1 0 0 1 1 0 |
| 19 | 1 1 1 0 0 0 1 0 | 1 0 0 1 0 1 0 0 |
| 20 | 1 1 1 0 0 1 0 0 | 0 0 0 0 0 0 0 0 |
| 21 | 1 1 1 0 0 0 1 0 | 0 0 0 1 0 1 0 0 |
| 22 | 1 1 0 1 1 1 0 0 | 0 0 1 0 0 1 1 0 |
| 23 | 1 1 0 1 0 0 1 1 | 0 0 1 1 1 0 0 0 |
| 24 | 1 1 0 0 0 1 1 1 | 0 1 0 0 0 1 1 1 |
| 25 | 1 0 1 1 1 0 0 0 | 0 1 0 1 0 0 1 1 |
| 26 | 1 0 1 0 0 1 1 0 | 0 1 0 1 1 1 0 0 |
| 27 | 1 0 0 1 0 1 0 0 | 0 1 1 0 0 0 1 0 |
| 28 | 0 0 0 0 0 0 0 0 | 0 1 1 0 0 1 0 0 |
| 29 | 0 0 0 1 0 1 0 0 | 0 1 1 0 0 0 1 0 |
| 30 | 0 0 1 0 0 1 1 0 | 0 1 0 1 1 1 0 0 |
| 31 | 0 0 1 1 1 0 0 0 | 0 1 0 1 0 0 1 1 |

B PHASE CURRENT VALUE / A PHASE CURRENT VALUE

B PHASE CURRENT POLARITY 0=+, 1=−
A PHASE CURRENT POLARITY 0=+, 1=−

ROTOR POSITION 5X 1X → 1Y 1Z
(9) (10)
(8) 5Y (10)
(9)
2X 5Z
2Y
2Z
(8) (9)
3X (10)
3Y
(8) (9)
4X 3Z
(10)
4Y
(8)
4Z

SCANNING DEVICE HAVING A MEMORY FOR STORING DRIVING STEPS FOR A STEPPING MOTOR

BACKGROUND OF THE INVENTION

1. Field of the Invention

This invention relates to a scanning device which uses a stepping motor. Such a scanning device is used in, for example, an original reading apparatus, a printer, a facsimile apparatus, etc.

2. Description of the Related Art

Conventionally, an apparatus of the type which performs magnification sub-scanning by means of a stepping motor, such as a full-line-type dot printer or an image scanner, has performed the sub-scanning of one line using n steps (n: integer) of a 2-phase or 1-2 phase excitation system. Considered here will be a facsimile apparatus which is adapted to perform, when the magnification ratio is 1/1, the sub-scanning of one line at the following levels: (a) Standard level with 8 steps per line (reading/recording resolution: 3.85 lines/mm); (b) Fine level with 4 steps per line (reading/recording resolution: 7.7 lines/mm); and (c) Super-Fine level with 2 steps per line (reading/recording resolution: 15.4 lines/mm). Supposing that the magnification sub-scanning of one line is performed by this facsimile apparatus, with a magnification ratio of 5/4, the number of steps per line will be as follows:

Standard: $8 \times 5/4 = 10$ steps/line
Fine: $4 \times 5/4 = 5$ steps/line
Super Fine: $2 \times 5/4 = 2.5$ steps/line However, a magnification sub-scanning at the rate of 2.5 steps/line, of Super Fine level, cannot be executed, so that, in that case, sub-scanning has conventionally been performed using the rate of 2 steps/line and the rate of 3 steps/line, alternately.

Thus, in the above conventional facsimile apparatus, two different rates, i.e., 2 steps/line and 3 steps/line, are mingled with each other when performing the magnification sub-scanning of one line. This arrangement leads to the following problems:

(1) The sub-scanning line density per line is not constant. That is, the sub-scanning feeding amount when the rate is 3 steps/line is 1.5 times larger than when the rate is 2 step/line.

(2) The pulse rate of the stepping motor is not constant, so that vibration and noise are caused.

Thus, if the line period is to be kept constant, the pulse rate cannot be constant since the pulse rate for the 2 steps/line scanning has to be different from that for the 3 steps/line scanning, with the result that the stepping motor is subject to vibration;

(3) The above problems might be eliminated by augmenting the number of steps per line. That, however, would make it impossible to produce apparatuses of higher speeds or lead to an excessive increase in the production cost;

(4) It is difficult to set the magnification ratio arbitrarily.

If, for example, a reduction from B4 size (257 mm) to A4 size (210 mm) is to be performed "correctly", the number of steps per line when the magnification ratio is 1/1 has to be 210 steps/line. From a practical point of view, scanning at such a rate cannot be executed.

SUMMARY OF THE INVENTION

It is accordingly an object of this invention to provide a scanning device which is free from the above-mentioned problems.

Another object of this invention is to provide a scanning device which can perform scanning with a constant scan feeding amount, driving the stepping motor at a constant pulse rate. Such a scanning device involves less vibration and noise.

Still another object of this invention is to provide a scanning device which allows the scanning magnification ratio to be set arbitrarily.

In one aspect of this invention, a scanning device is provided, which is adapted to control the number of microsteps (fractional steps as opposed to full steps) per scanning unit of the stepping motor on the basis of data stored in a table.

In another aspect of this invention, a scanning device is provided, which is adapted to control the number of microsteps per scanning unit of the stepping motor in correspondence with changes in scanning density.

In accordance with a further aspect of this invention, there is provided a magnification sub-scanning device of the type in which reading or recording of information is performed by means of a stepping motor and in which magnification in the sub-scanning direction is effected by changing, in accordance with the magnification ratio, the feeding amount per line of the sub-scanning effected by the stepping motor, the magnification sub-scanning device comprising a motor drive control means, which is adapted to drive the stepping motor by a microstep drive system, thereby making it possible to effect magnification sub-scanning by changing the number of microsteps per line in accordance with the magnification ratio.

With the above construction, the driving of the stepping motor is controlled by a microstep drive system and sub-scanning when the magnification ratio is not 1/1 is always performed with a constant number of microsteps per line, so that the sub-scanning line density per line is constant even when the magnification ratio is not 1/1, thereby improving the image quality. Furthermore, this construction involves less vibration and noise because of the constant pulse rate of the stepping motor.

In accordance with another aspect of this invention, there is provided a magnification sub-scanning device of the type in which reading or recording of information is performed by means of a stepping motor and in which magnification in the sub-scanning direction is effected by changing, in accordance with the magnification ratio, the feeding amount per line of the sub-scanning effected by the stepping motor, the magnification sub-scanning device comprising: a memory means which previously stores microstep drive information which indicates the values and directions of phase currents to be supplied to the stepping motor, the above-mentioned microstep drive information being stored in a plurality of areas of a common table in the memory means, the number of the areas being equal to a common denominator which is obtained by reducing a plurality of designatable magnification ratios which are expressed in the form of fractions; a computing/controlling means, which is adapted to successively read the corresponding items of microstep drive information out of the storage means; and a motor driving means, which is adapted to drive the stepping motor by a microstep drive system in accordance with the corresponding items of microstep drive information read by the computing/controlling means and effect magnification sub-scanning by changing the number of microsteps per line in accordance with the magnification ratio.

With the above construction, sub-scanning when the magnification ratio is not 1/1 is always performed with a constant number of microsteps per line, and sub-scanning can be performed with a single microstep table even in an apparatus for which a plurality of magnification ratios are available. Accordingly, the sub-scanning line density per line is constant even when the magnification ratio is not 1/1, which leads to an improved image quality. Further, since the pulse rate of the stepping motor is constant, the vibration and noise can be reduced.

In accordance with still another aspect of this invention, there is provided a magnification sub-scanning device of the type in which reading or recording of information is performed by means of a stepping motor and in which magnification in the sub-scanning direction is effected by changing, in accordance with the magnification ratio, the feeding amount per line of the sub-scanning effected by the stepping motor, the magnification sub-scanning device comprising: a storage means which previously stores microstep drive information, which indicates the value and directions of a phase current to be supplied to the stepping motor, the above-mentioned microstep drive information being stored in respective regions of a common table in the storage means, the number of regions of the above-mentioned common table being equal to a common denominator of a plurality of designatable magnification ratios which are expressed in the form of simple fractions approximated so as to have a common denominator; a computing/controlling means, which is adapted to successively read the corresponding items of microstep drive information out of the storage means; and a motor drive means, which is adapted to drive the stepping motor by a microstep drive system in accordance with the corresponding items of microstep drive information read out by the computing/controlling means and effect magnification sub-scanning while changing the number of microsteps per line in accordance with the magnification ratio.

With the above construction, sub-scanning when the magnification ratio is not 1/1 is always effected with a constant number of microsteps, enabling sub-scanning to be performed with a single type of microstep table even in an apparatus having a plurality of magnification ratios. Accordingly, the sub-scanning line density per line is constant even when the magnification ratio is not 1/1, which leads to an improved image quality. Further, since the pulse rate of the stepping motor is constant, the vibration and noise can be reduced.

Other aspects, features and advantages of the present invention will become apparent from the following detailed description and the accompanying drawings.

BRIEF DESCRIPTION OF THE DRAWINGS

FIG. 4 comprises of a memory map showing an example of the contents of the microstep table (which is referred to as "the ROM table") stored in the ROM of FIG. 2 and a diagram showing the rotor positions as related to the memory map.

DETAILED DESCRIPTION OF THE PREFERRED EMBODIMENTS

Embodiments of this invention will now be described detail with reference to the accompanying drawings.

Figure 1:
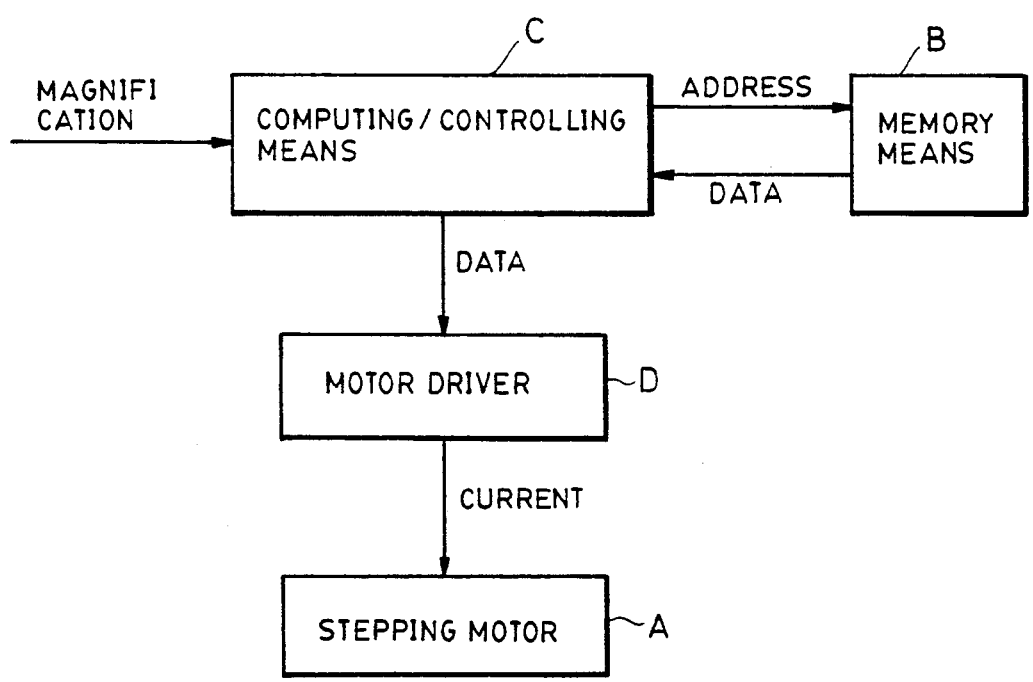
FIG. 1 is a block diagram showing the basic construction of a device of an embodiment in accordance with this invention.

FIG. 1 shows the basic construction of the embodiments of this invention described below. In the drawing, the scanning apparatus includes a stepping motor A, which is used as a driving means for performing scanning to effect reading or recording of information. Magnification in the scanning direction can be effected by changing the feeding amount per scanning unit of the sub-scanning, which is effected by this motor A, in accordance with the magnification ratio.

The reference symbol B indicates a memory means, in which microstep drive information indicating the respective values and directions of phase currents which are to be supplied to the stepping motor A, is previously stored. These values and directions are respectively stored in a common table, which is provided in this memory means B and divided into a plurality of areas. The number of areas is determined as follows: assuming a plurality of magnification ratios are available for the above-mentioned magnification in the scanning direction, these magnification ratios, expressed as fractions, are reduced to a common denominator. The number of areas into which the above-mentioned table is divided is equal to this common denominator.

The reference symbol C indicates a computing/controlling means, which is adapted to successively read the corresponding items of microstep drive information out of the storage means B in accordance with the magnification ratio, which is designated by an external apparatus.

The reference symbol D indicates a motor driving means, which is adapted to drive the stepping motor A by a microstep drive system in accordance with the corresponding items of microstep drive information read by the computing/controlling means C. Thus, magnification sub-scanning is effected by changing the number of microsteps per scanning unit in accordance with the magnification ratio.

Figure 2:
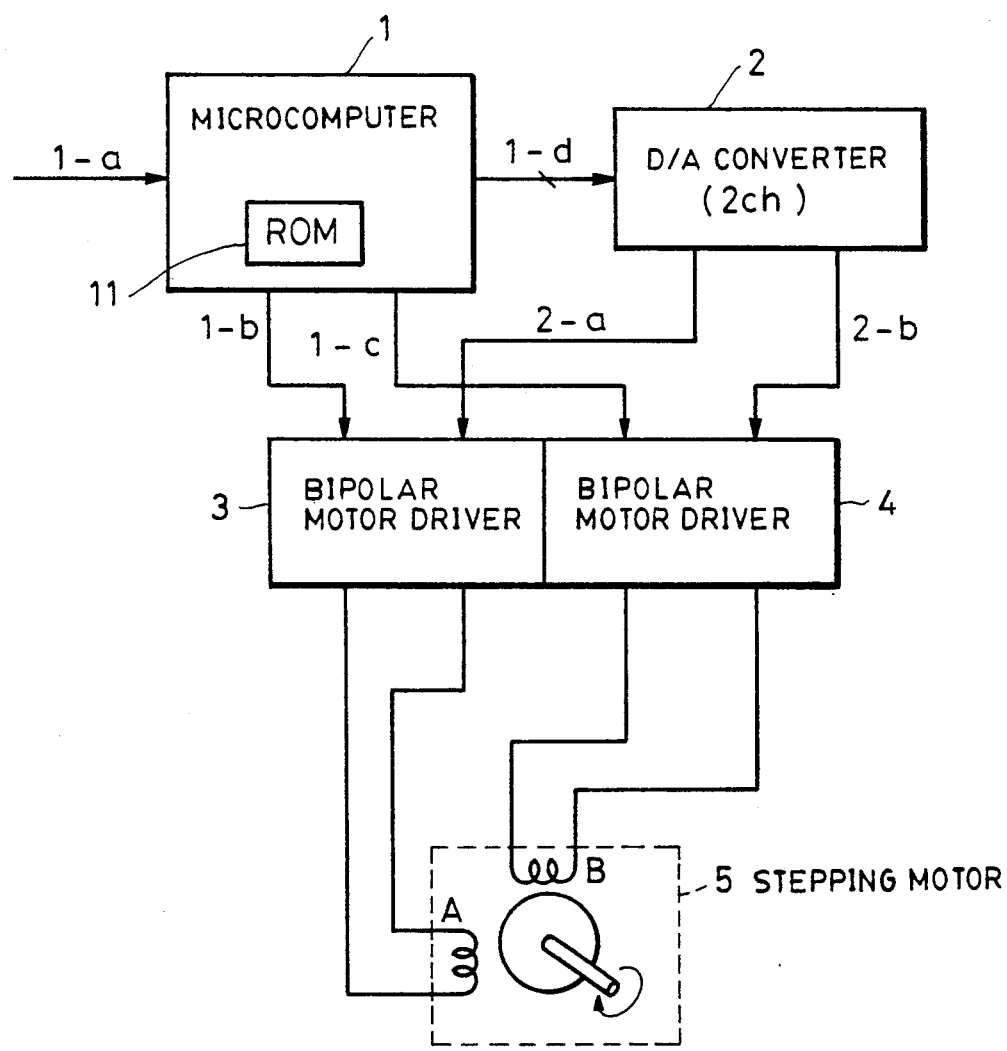
FIG. 2 is a block diagram showing the circuit configuration of an embodiment of this invention.

FIG. 2 shows the circuit configuration of an embodiment of this invention (hereinafter referred to as "the first embodiment"). This embodiment includes a microcomputer 1 for microstep drive control, a two-channel D/A (digital/analog) converter 2, bipolar motor drivers 3 and 4 of a constant-current chopper type, and a stepping motor 5 of a two-phase bipolar type. The rotating shaft of the stepping motor 5 is connected to a paper feeding mechanism, an original feeding mechanism, or a head feeding mechanism (not shown). Provided inside or outside the microcomputer 1 is ROM (read-only memory) 11, which previously stores a microstep table, which will be described below. The input terminal of the microcomputer 1 is connected to a control block (not shown), for example, a main CPU, which performs overall control of the apparatus. The control block, such as a main CPU, supplies magnification ratios and drive timing signals to the microcomputer 1 through the input terminal thereof.

Figure 3:
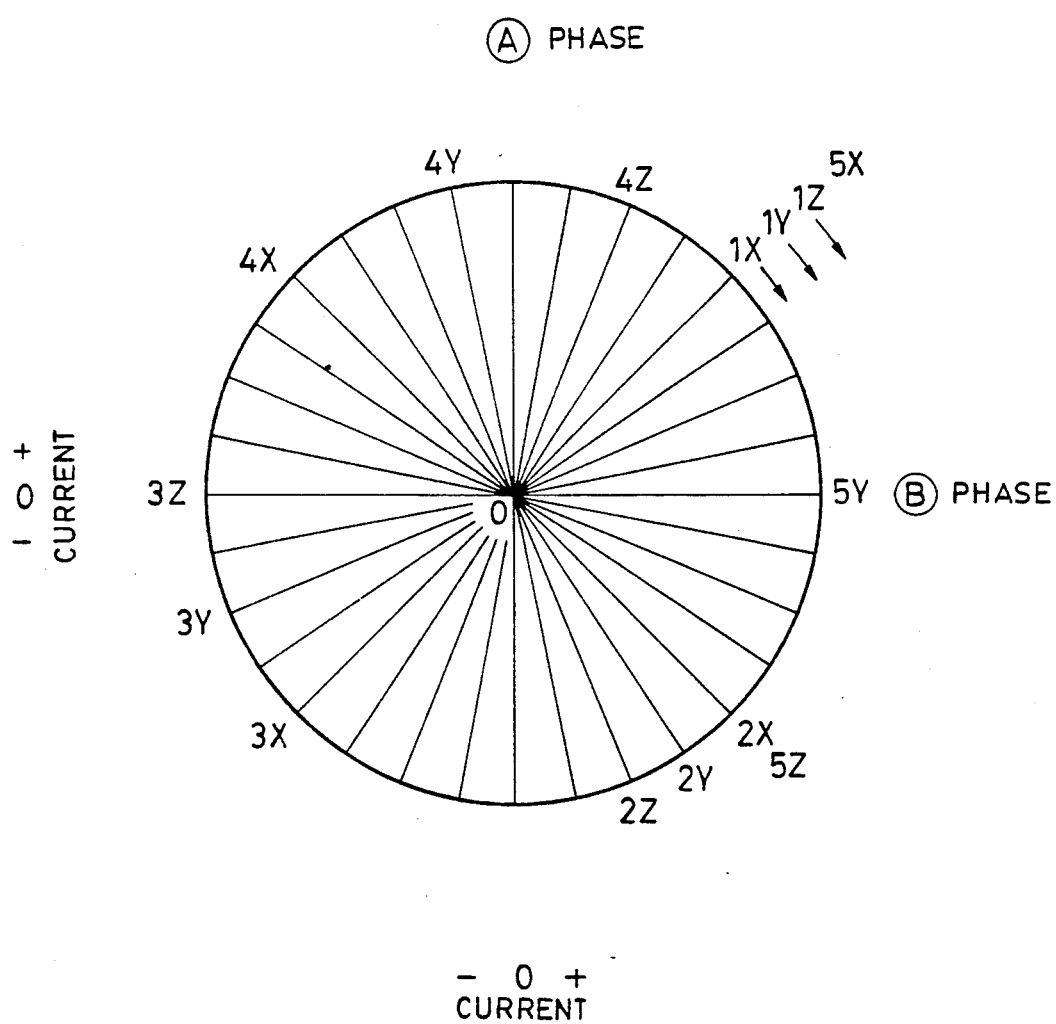
FIG. 3 is a graph showing the relationship between the current supplied to phases A, B and the rotation of the rotor, in the stepping motor of FIG. 2, when the rotation is effected by a microstep drive system with one step of a 2-phase excitation system being divided into 8 sections.

FIG. 3 shows the relationship between the value of the current supplied to phases A, B of a two-phase excitation system and the rotating position of the rotor. In the case shown in FIG. 3, microstep drive is performed by dividing one step of the two-phase excitation system into eight portions.

First, a case will be considered where the sub-scanning of one line when the magnification ratio is 1/1 is performed with one step of the two-phase excitation system. If, in this case, a one-line trigger pulse is supplied from an external apparatus to the microcomputer 1 through the input line 1-a, the microcomputer 1 controls the rotation of the stepping motor 5 through the bipolar motor drivers 3, 4 to cause the stepping motor, which has previously been at the position 1X of FIG. 3, to be driven by one step of the two-phase system and rotated by 90°, i.e., to the position 2X of the same drawing. If another one-line trigger pulse is supplied to the microcomputer 1, the stepping motor 5 is rotated likewise to the position 3X.

Thus, when the magnification ratio is 1/1, the rotor of the stepping motor 5 is rotated by 90° each time a trigger pulse is supplied to the microcomputer 1, as described with reference to FIG. 3. In the case of FIG. 3, 90° corresponds to one step of the two-phase drive system. In the case of a 7.5°/step stepping motor, for example, one step, which is 90° in the case of FIG. 3, corresponds to 7.5. when expressed as an angle of rotation of the rotor.

Next, a case will be considered where sub-scanning is effected with a magnification ratio which is not 1/1 but, for example, 9/8. In this case, the magnification is effected by setting the feeding amount per line 9/8 times larger than the feeding amount per line in the case where the magnification ratio is 1/1. Accordingly, the angle of rotation corresponding to one step of the two-phase system is divided into eight equal portions (microsteps). Nine of these microsteps constitute the angle of rotation corresponding to one line. Thus, in FIG. 3, the stepping motor 5 rotates successively in the following order: 1Y→2Y→3Y→4Y→5Y in response to the trigger pulses supplied to the microcomputer 1.

Concretely, the microstep drive of the stepping motor 5 in this embodiment is realized by setting different values for the currents supplied to phases A, B of a two-phase excitation system. For example, a current of 100 mA is supplied to phase A while a current of 30 mA is supplied to phase B. The respective magnitudes of the currents supplied to these phases are determined by the value of a reference voltage which is applied to the motor drivers 3 and 4. The value of this reference voltage is obtained by D/A-converting digital data which is supplied to the D/A converter 2 from the microcomputer 1 through the output line 1-d. Further, the respective directions of the currents supplied to these phases are determined by output values supplied from the microcomputer 1 to the motor drivers 3 and 4 through output lines 1-b and 1-c, respectively.

The data to be supplied from the microcomputer 1 to the pair of motor drivers 3 and 4 is previously written into a table prepared in the ROM 11, which is provided inside (or outside) the microcomputer 1. FIG. 4 shows an example of such a table. Thus, the respective values of the currents supplied to phases A and B (that is, the data supplied to the D/A converter 2) and the respective current directions (that is, the data supplied to the motor drivers 3 and 4) are previously written into respective table addresses (read addresses) of this table.

In the ROM table, which is shown in the left-hand-side section of FIG. 4, the table addresses 0 to 31 respectively correspond to the respective positions of the microsteps of FIG. 3. Each of the two-byte items of data includes the B-phase current polarity (one bit), the B-phase current value (seven bits), the A-phase current polarity (one bit), and the A-phase current value (seven bits). In this ROM table, the current polarity of each phase is expressed by "0", which indicates "+" (positive), or "1", which indicates "−" (negative). The diagram in which arrows are used, which is in the right-hand-side section of FIG. 4, shows the relationship between the respective rotor movements corresponding to the different magnifications in FIG. 3 and the respective addresses in the ROM table. In this diagram, the positions 1X, 2X, 3X, 4X, . . . represent the step positions when the magnification ratio is 1/1; the positions 1Y, 2Y, 3Y, 4Y, . . . represent the step positions when the magnification ratio is 9/8; and the positions 1Z, 2Z, 3Z, 4Z, . . . represent the step positions when the magnification ratio is 10/8.

In the above construction, the microcomputer 1 reads, in response to the trigger pulses supplied thereto, the corresponding items of data from the table shown in FIG. 4, which data is provided in the above-mentioned ROM 11, and supplies the data thus read to the D/A converter 2 and the motor drivers 3, 4. When the magnification ratio is 1/1, the change in angle of rotation corresponding to one line is effected by advancing eight addresses when the ROM table is being read. When the magnification ratio is 9/8, the same change is effected by advancing nine addresses when the table is being read, and, when the magnification ratio is 10/8, by advancing ten addresses. The table data may be output once for one line. In that case, the data to be output is obtained by advancing a predetermined number of addresses (eight when the magnification ratio is 1/1) when reading the table. Alternatively, one line may be divided into a number of sections in terms of time, thus effecting the drive by a plurality of microsteps. For example, the table data may be read by advancing four addresses at one time when the magnification ratio is 1/1. In that case, the table data is output twice for one line.

Thus, the above-mentioned table is prepared in the memory 11 in the following manner: assuming that the magnification ratio is m/n and that the angle of rotation corresponding to one line of the stepping motor 5, when the magnification ratio is 1/1, is $\theta$, one microstep is $\theta/n$. The microcomputer 1 drives the stepping motor 5 in accordance with table data, which is obtained by advancing m addresses for one line when the ROM table is being read, thus effecting magnification sub-scanning with m/n magnification ratio.

One of the following types of table system may be adopted when effecting microstep drive in an apparatus for which a plurality of magnification ratios are available when reading or recording information:

(1) Basic Form

A plurality of tables respectively corresponding to the different magnification ratios are provided in this basic form. When driving the stepping motor, the table corresponding to the designated magnification ratio is used, and magnification sub-scanning is executed on the basis of table data which is obtained by advancing a predetermined number of addresses, when the table is being read, in accordance with the designated magnification ratio.

When, for example, a reduction from B4 size to A4 size is effected, i.e., when the magnification ratio is 210/257, a microstep table which is divided into 257 areas is used, the requisite table data being obtained by advancing 210 addresses for each line when the table is being read. When a reduction from A3 size to B4 size is effected, i.e, when the magnification ratio is 257/297, a microstep table which is divided into 297 areas is used, the requisite data being obtained by 257 addresses for each line when the table is being read.

(2) Improved Form 1

A plurality of magnification ratios, expressed in the form of fractions, are reduced to a common denominator, and a microstep table which is divided into a plurality of areas is provided, the number of these areas being equal to the above-mentioned common denominator. When the stepping motor is being driven, data is read from this microstep table, which advances a predetermined number of addresses thereof in accordance with the magnification ratio.

In the case of an apparatus having magnification ratios of 4/5 and 5/6, for example, these magnification ratios are reduced to 24/30 and 25/30, respectively. In this case, a microstep table is divided into thirty areas, which number corresponds to the common denominator of the above magnification ratios. This improved form is superior to the above-described basic form in that it requires a smaller number of tables.

(3) Improved Form 2

In some cases, the basic form and the improved form described in the above (1) and (2) may involve the following problem: the common denominator to be obtained may be excessively large depending upon the combination of magnification ratios, with the result that the capacity of the ROM table has to be excessively large. In this improved form, such magnification ratios are approximated to simpler fractions having a common denominator. Such an approximation is effected to such an extent that no problems are involved for practical use of the apparatus. Then, a common microstep table i.e., an ROM table, is provided, which table is divided into a plurality of areas, the number of these areas being equal to the common denominator.

For example, the magnification ratios of 257/210, 297/257, and 297/210 may be reduced to a common denominator as follows:

$$257/210 \rightarrow 10/8$$
$$(= 1.224)\ (= 1.25)$$

$$297/257 \rightarrow 9/8$$
$$(= 1.156)\ (= 1.125)$$

$$297/210 \rightarrow 11/8$$
$$(= 1.414)\ (= 1.375)$$

Thus, the above magnification ratios are approximated to the simpler fractions of 10/8, 9/8, and 11/8 and a microstep table which is divided into 8 areas is prepared.

By keeping the errors involved when thus approximating the fractions within the range of approx. 3%, as in the above case, there will generally be no problems for practical use. The integer n to be selected as the common denominator is preferably 8, 16, 32, etc. It is desirable that the integer n be not in excess of 64 in view of the precision of the stepping motor in the micro step driving method. Further, it is desirable that the integer n be a power of 2 to ease the control by a computer.

(4) Modified Form

In the above cases, the address of the ROM is advanced by m steps. A ROM can be substituted by a RAM having a table in accordance with the magnification. The RAM stores the data of the table of the designated magnification before scanning, and the address of the RAM is advanced by one step for each line.

While in the first embodiment of this invention, which is shown in FIG. 2, the data to be supplied to the D/A converter 2 and the motor drivers 3, 4 is read from a ROM table, this arrangement should not be construed as restrictive. For example, the data to be output may be expressed as a function of the angle of rotation $\theta$, obtaining the data through calculation using this function. For example, phases A and B may be expressed as $A\sin\theta$ and $B\cos\theta$, respectively (A, B: constants). The actual value of the angle of rotation may then be substituted for the above $\theta$. Then, the direction of the current to be supplied to the stepping motor can be determined in accordance with the polarity of the result of this calculation, and the magnitude of the current in accordance with the absolute value of the result of the same, thus effecting magnification sub-scanning as in the case where a ROM table is referred to.

Although the first embodiment of this invention, which is shown in FIG. 2, employs a two-phase bipolar motor, this should not be construed as restrictive. A microstep operation can be performed even with a motor with a different phase number, such as a unipolar motor or a five-phase motor, by setting different values for the respective currents supplied to the respective phases. Accordingly, an effect that is similar to that of the first embodiment can also be obtained by this arrangement.

Figure 5:
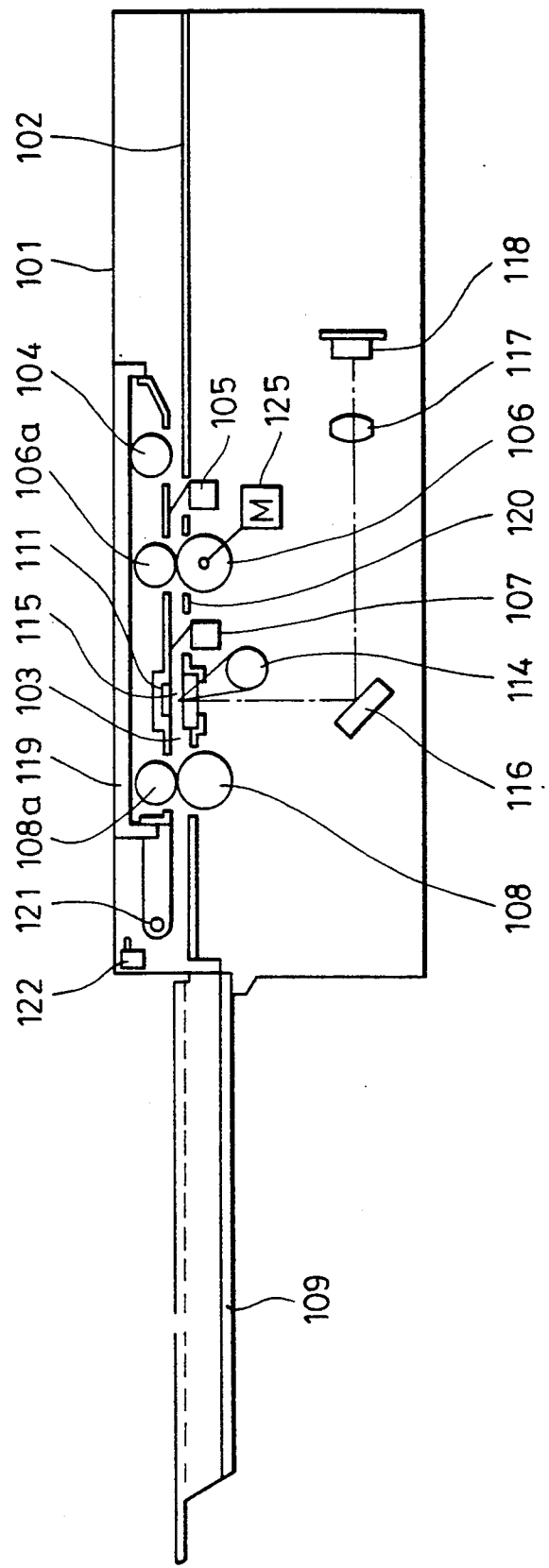
FIG. 5 is a sectional view of a reading apparatus to which the present invention can be applied.

FIG. 5 is a diagram showing the construction of an image reading apparatus to which this invention is applied.

The image reading apparatus shown includes an apparatus body 101, an original platen 102 on which the original is set, and an original feeding path 103 which is formed on the extension of the original platen 102. The following components are arranged along this original feeding path 103 in order as seen from the upstream side: a pick-up roller 104 for feeding an original sheet, a microswitch 105 which is adapted to operate when subjected to a light force so as to detect the original sheet, a pair of feeding rollers 106, 106a, a microswitch 107 which is adapted to operate upon faint when subjected to a light force so as to detect the leading edge and the rear edge of the original sheet, a pair of feeding rollers 108, 108a, and a paper discharge tray 109 for discharging the original sheet. The reference numeral 125 indicates a stepping motor in accordance with this invention, which is controlled, as described above, by a microstep system.

The image reading apparatus shown further includes a fluorescent lamp 114 which constitutes the light source for illuminating the original sheet, a mirror 116, a lens 117, and a photoelectric transfer device 118 which comprises of a plurality of light receiving elements. The fluorescent lamp 114 illuminates the original sheet conveyed to the reading position 115, and the light reflected by the original sheet travels by way of the mirror 116 and the lens 117 and impinges upon the photoelectric transfer device 118. In this way, the original sheet is scanned line by line. Further, a white reference plate 111, which is uniformly colored white, is provided at the reading position 115.

The above-mentioned feeding path 103 is composed of a guide unit 119 and a guide member 120 and can be opened upwardly over the original reading position 115. That is, the guide unit 119 is mounted in such a manner as to be rotatable around a fulcrum 121 provided on the apparatus body. Opening the feeding path 103 causes a microswitch 122 to be turned on, which means the opening of the feeding path 113 can be detected.

The operation of this image reading apparatus, constructed as described above, will be explained as follows.

An original sheet is placed on the original stand 102 and the start switch, which is provided in the operating section of the apparatus, is properly manipulated, with the guide unit 119, i.e., the feeding path 103, being closed. Then, the microswitch 105 detects the original sheet and a solenoid (not shown) is turned on. The pick-up roller 104 is then pressed against the original sheet, which is conveyed to the left (as seen in the drawing). When the leading edge of the original sheet has been positioned between the feeding rollers 106, 106a and the microswitch 107 has detected the original sheet, the above-mentioned solenoid is turned off, and thus the original sheet is released from the pressing force of the pick-up roller 104.

When the solenoid has been thus turned off and the original sheet has been released from the pressing force of the pick-up roller 104, the stepping motor is driven by SA steps, the original sheet being conveyed a distance A which corresponds to the distance from the microswitch 107 to the reading position 115. When the leading edge of the original sheet reaches the reading position 115, the reading of the original image is started. In this reading process, the fluorescent lamp 114 illuminates the original sheet, and the light reflected by the original sheet travels by way of the mirror 116 and the lens 117 to form an image on the photoelectric transfer device 118. The reading is effected by converting the image line by line into electric signals. Meanwhile, the stepping motor 125 is driven by a microstep system in accordance with the designated magnification ratio to feed the original sheet line by line. When the rear edge of the original sheet has reached the reading position 115 to complete the reading process, the motor is driven by SB steps which correspond to the distance B between the reading position 115 and the feeding rollers 108, 108a, the original sheet being discharged onto the tray 109. Thus, the operation of reading the original sheet is completed.

This invention is applicable to a variety of apparatuses which perform scanning. Thus, it goes without saying that this invention can be applied not only to apparatuses of the type in which original sheets, recording paper sheets or the like are fed, but also to apparatuses of the type in which an image reading head, a recording head or the like is shifted in the line direction. The present invention is also applicable to a recording apparatus of the type which rotates a photosensitive drum by means of a stepping motor. Further, this invention is also applicable not only to reading or recording apparatuses which perform sub-scanning, but also to apparatuses which perform main scanning by means of a motor. Further, this invention is not limited to reading/recording apparatuses; it is also applicable to apparatuses which are adapted to perform uniform drive by means of a stepping motor.

This invention described above provides the following advantages:

(1) Since the stepping motor for scanning is driven by a microstep drive system, the feeding amount per scanning unit can always be kept constant even when the magnification ratio is not 1/1, so that the sub-scanning density per scanning unit is constant. Accordingly, an improvement in image quality can be expected.

(2) Since it is driven by a microstep drive system, the stepping motor can always be driven at a constant pulse rate even when the magnification ratio is not 1/1, so that vibration and noise can be reduced.

(3) Since the stepping motor is driven by a microstep drive system, magnification ratios having a large denominator can be selected without any serious problems arising, thus enabling the magnification ratios to be set arbitrarily. Furthermore, this arrangement does not constitute a barrier to the production of high-speed apparatuses or cause an increase in production costs.

(4) A common microstep table can be prepared by reducing a plurality of magnification ratios, which are expressed as fractions, to a common denominator, so that a simple, low cost table system can be provided.

It should be understood that a variety of changes and modifications may be made in the present invention within the scope as set out in the accompanying claims.

What is claimed is:

1. A scanning device comprising:
   a stepping motor driven by microsteps;
   a memory for storing predetermined microstep drive information which indicates values and directions of phase currents supplied to said stepping motor, said microstep drive information being stored in a plurality of areas of a table which is provided in said memory, the number of said areas corresponding to a denominator which represents designated magnification ratios which are expressed as a fraction; and
   a motor driver for successively reading corresponding items of said microstep drive information from said memory in accordance with a designated magnification ratio.

2. A scanning device according to claim 1, wherein a number of addresses to be advanced, is advanced per a number of a numerator of the fraction which indicates a magnification ratio.

3. A scanning device according to claim 2, said drive data for a plurality wherein said stepping motor performs sub-scanning for each line.

4. A scanning device according to claim 1, wherein said memory stores data in which magnification ratios are approximated to simple fractions.

5. A magnification scanning device for reading or recording information, comprising:
   a stepping motor which is driven by a microstep system;
   a driver for driving said stepping motor in accordance with a designated magnification ratio;
   a memory for storing predetermined microstep drive information which indicates values and directions of phase currents supplied to said stepping motor, said microstep drive information being stored in a plurality of areas of a common table in said memory, a number of said areas being equal to a common denominator which is obtained by reducing a plurality of designatable magnification ratios which are expressed as fractions; and means for successively reading the corresponding items of said microstep drive information from said memory in accordance with the designated magnification ratio and supplying them to said driver.

6. A magnification scanning device according to claim 5, wherein the number of addresses which are advanced for each scanning unit when data is being read from said memory is changed in accordance with the designated magnification ratio.

7. A magnification scanning device according to claim 5, wherein said stepping motor performs sub-scanning for each of a plurality of lines.

8. A magnification scanning device according to claim 5, wherein said memory stores data in which a plurality of magnification ratios are approximated to simple fractions.

9. A magnification scanning device for reading or recording information, comprising:

a stepping motor which is driven by microsteps;

memory means for storing predetermined microstep drive information which indicates values and directions of phase currents to be supplied to said stepping motor, said microstep drive information being stored in a plurality of areas of a common table which is provided in said memory means, the number of said areas being equal to a common denominator which is obtained by approximating a plurality of designated table magnification ratios to simple fractions so that they may have a common denominator;

controlling means for successively reading said microstep drive information from said memory means in accordance with a designated magnification ratio; and motor driving means for driving said stepping motor by microsteps in accordance with the microstep drive information read out by said controlling means.

10. A magnification scanning device according to claim 9, wherein the common denominator of said simple fractions does not exceed 64.

11. A magnification scanning device according to claim 9, wherein the common denominator of said simple fractions is a power of two.

12. A magnification scanning device according to claim 9, wherein said stepping motor effects sub-scanning feeding for each of a plurality of lines.

* * * * *

UNITED STATES PATENT AND TRADEMARK OFFICE
CERTIFICATE OF CORRECTION

PATENT NO. : 5,151,640
DATED : September 29, 1992
INVENTOR(S) : SAKAMOTO ET AL.

It is certified that error appears in the above-identified patent and that said Letters Patent is hereby corrected as shown below:

COLUMN 1

Line 48, "step/line." should read --step/line;--.
Line 60, "cost;" should read --cost; and--.

COLUMN 5

Line 30, "7.5." should read --7.5°--.

COLUMN 8

Line 56, "upon faint" should be deleted.

Signed and Sealed this

Nineteenth Day of October, 1993

Attest:

BRUCE LEHMAN

Attesting Officer     Commissioner of Patents and Trademarks